(12) United States Patent
Meng et al.

(10) Patent No.: US 9,882,699 B2
(45) Date of Patent: Jan. 30, 2018

(54) DEVICE AND METHOD OF HANDLING DEVICE-TO-CELLULAR COMMUNICATION

(71) Applicant: HTC Corporation, Taoyuan (TW)

(72) Inventors: Ling-San Meng, Taoyuan (TW); Chih-Yao Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 228 days.

(21) Appl. No.: 14/818,286

(22) Filed: Aug. 4, 2015

(65) Prior Publication Data

US 2016/0037494 A1 Feb. 4, 2016

Related U.S. Application Data

(60) Provisional application No. 62/032,646, filed on Aug. 4, 2014, provisional application No. 62/037,126, filed on Aug. 14, 2014.

(51) Int. Cl.
| | |
|---|---|
| *H04W 72/04* | (2009.01) |
| *H04L 5/00* | (2006.01) |
| *H04L 1/18* | (2006.01) |
| *H04W 76/02* | (2009.01) |
| *H04L 5/14* | (2006.01) |

(52) U.S. Cl.
CPC .......... *H04L 5/0055* (2013.01); *H04L 1/1812* (2013.01); *H04L 1/1854* (2013.01); *H04L 5/0048* (2013.01); *H04L 5/14* (2013.01); *H04W 72/042* (2013.01); *H04W 76/023* (2013.01); *H04L 1/1864* (2013.01)

(58) Field of Classification Search
None
See application file for complete search history.

(56) References Cited

U.S. PATENT DOCUMENTS

| | | |
|---|---|---|
| 2010/0232373 A1 | 9/2010 | Nory |
| 2014/0056220 A1 | 2/2014 | Poitau |
| 2014/0086112 A1 | 3/2014 | Stern-Berkowitz |
| 2014/0269338 A1* | 9/2014 | Jung .................... H04L 5/0055 370/241 |

(Continued)

OTHER PUBLICATIONS

European Search report issued on Jan. 7, 2016 for EP application No. 15179714.9.

(Continued)

*Primary Examiner* — Charles C Jiang
*Assistant Examiner* — George Atkins, Jr.
(74) *Attorney, Agent, or Firm* — Winston Hsu

(57) ABSTRACT

A network for handling a downlink (DL) transmission in a frequency-division duplexing (FDD) system comprise a storage unit for storing instructions and a processing means coupled to the storage unit. The processing means is configured to execute the instructions stored in the storage unit. The instructions comprise selecting a reference configuration for a DL transmission of a communication device from a plurality of configuration candidates; transmitting information of the reference configuration to the communication device; receiving a hybrid automatic repeat request (HARQ) feedback corresponding to the DL transmission from the communication device according to the reference configuration; and performing the DL transmission with the communication device according to the reference configuration.

16 Claims, 8 Drawing Sheets

(56) References Cited

U.S. PATENT DOCUMENTS

| | | | |
|---|---|---|---|
| 2015/0003315 A1 | 1/2015 | Chen | |
| 2015/0085719 A1* | 3/2015 | Yin | H04L 1/1896 370/280 |
| 2015/0092757 A1 | 4/2015 | Tiirola | |
| 2015/0305000 A1* | 10/2015 | Nguyen | H04L 5/14 370/329 |
| 2016/0020849 A1 | 1/2016 | Wu | |
| 2016/0149687 A1 | 5/2016 | Lei | |
| 2016/0192391 A1* | 6/2016 | Larsson | H04L 1/1893 370/280 |
| 2016/0204906 A1* | 7/2016 | Cheng | H04L 1/0077 370/280 |
| 2016/0219634 A1* | 7/2016 | Lu | H04W 72/0406 |

OTHER PUBLICATIONS

Catt et al., "Way forward on FDD Scell PDSCH HARQ timing with TDD as Pcell", 3GPP TSG RAN WG1 Meeting #76, R1-140977, Feb. 10-14, 2014, Prague, Czech Republic, XP050770809, pp. 1-2.

NEC, "Discussion on Multiplexing D2D link and Cellular link", 3GPP TSG RAN WG1 Meeting #76, R1-140491, Feb. 10-14, 2014, Prague, Czech Republic, XP050736024, pp. 1-2.

Qualcomm Incorporated, "Solutions for TDD-FDD CA", 3GPP TSG RAN WG1 #74bis, R1-134610, Oct. 7-11, 2013, Guangzhou, China, XP050717695, pp. 1-7.

3GPP TR 36.828 V11.0.0 (Jun. 2012) Technical Report 3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11).

3GPP TS 36.213 V12.2.0 (Jun. 2014) Technical Specification 3rd Generation Partnership Project; Technical Specification Group Radio Access Network; Evolved Universal Terrestrial Radio Access (E-UTRA); Physical layer procedures (Release 12).

3GPP TSG RAN WG1 Meeting #74 R1-13xxxx Barcelona, Spain, Aug. 19-23, 2013 Source: MCC Support Title: Draft Report of 3GPP TSG RAN WG1 #73 v0.2.0 (Fukuoka, Japan, May 20-24, 2013).

3GPP TSG RAN WG1 Meeting #75 R1-135001 San Francisco, USA, Nov. 11-15, 2013 Source: MCC Support Title: Final Report of 3GPP TSG RAN WG1 #74bis v1.0.0 (Guangzhou, China, Oct. 7-11, 2013).

3GPP TSG RAN WG1 Meeting #76 R1-140001 Prague, CZ Rep., Feb. 10-14, 2014 Source: MCC Support Title: Final Report of 3GPP TSG RAN WG1 #75 v1.0.0 (San Francisco, USA, Nov. 11-15, 2013).

Office action dated Mar. 23, 2017 for the U.S. Appl. No. 14/816,084, filed Aug. 3, 2015, p. 1-11.

Notice of Allowance dated on Oct. 11, 2017 for the U.S. Appl. No. 14/816,084, filed Aug. 3, 2015, p. 1-11.

* cited by examiner

| UL/DL configuration | Subframe number 0 1 2 3 4 5 6 7 8 9 |
|---|---|
| 0 | D S U U U D S U U U |
| 1 | D S U U D D S U U D |
| 2 | D S U D D D S U D D |
| 3 | D S U U U D D D D D |
| 4 | D S U U D D D D D D |
| 5 | D S U D D D D D D D |
| 6 | D S U U U D S U U D |

FIG. 1 PRIOR ART

| FDD DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 4 | 4 | 4 | 4 | 4 | 4 | 4 | 4 | 4 |
| 1 | - | - | 6 | - | 4 | - | - | 6 | - | 4 |
| 2 | - | - | 7,6 | 4 | - | - | - | 7,6 | 4 | - |
| 3 | - | - | 8,7,4,6 | - | - | - | - | 8,7,4,6 | - | - |
| 4 | - | - | 7,6,11 | 6,5 | 5,4 | - | - | - | - | - |
| 5 | - | - | 12,8,7,11 | 6,5,4,7 | - | - | - | - | - | - |
| 6 | - | - | 13,12,9,8,7,5,4,11,6 | - | - | - | - | - | - | - |
| 7 | - | - | 7 | 7 | 5 | - | - | 7 | 7 | - |
| 8 | - | - | 6,5 | 5,4 | 4 | - | - | 6,5 | 5,4 | 4 |
| 9 | - | - | 7,6 | 6,5,4 | - | - | - | 7,6 | 6,5,4 | - |
| 10 | - | - | 8,7,6,5,4 | - | - | - | - | 8,7,6,5,4 | - | - |
| 11 | - | - | 11,10,9,8,7,6 | 6,5 | 5,4 | - | - | - | - | - |
| 12 | - | - | 12,11,10,9,8,7 | 7,6,5,4 | - | - | - | - | - | - |
| 13 | - | - | 13,12,11,10,9,8,7,6,5,4 | - | - | - | - | - | - | - |
| 14 | - | - | 8,7 | 7,6 | 6,5 | - | - | 7 | 7,6,5 | - |

FIG. 8

DEVICE AND METHOD OF HANDLING DEVICE-TO-CELLULAR COMMUNICATION

CROSS REFERENCE TO RELATED APPLICATIONS

This application claims both the benefit of U.S. Provisional Application No. 62/037,126, filed on Aug. 14, 2014 and the benefit of U.S. Provisional Application No. 62/032,646, filed on Aug. 4, 2014.

BACKGROUND OF THE INVENTION

1. Field of the Invention

The present invention is related to a communication device and a method used in a wireless communication system, and more particularly, to a communication device and a method of handling a device-to-cellular (D2C) communication in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system operating in a frequency-division duplexing (FDD) mode (or simply FDD system), transmission directions of subframes of a frequency band in the LTE/LTE-A system operating in a time-division duplexing (TDD) mode (or simply TDD system) may be different. That is, the subframes in the same frequency band are divided into UL subframes, downlink (DL) subframes and special subframes according to the UL/DL configuration specified in the 3GPP standard.

FIG. 1 is a table 10 of the UL/DL configurations with subframes and corresponding directions according to the prior art. In FIG. 1, 7 UL/DL configurations are shown, wherein each of the UL/DL configurations indicates a set of transmission directions (hereinafter, directions, for short) for 10 subframes, respectively. Each subframe is indicated with a corresponding subframe number (i.e., subframe index) in FIG. 1. In detail, "U" represents that the subframe is a UL subframe where UL data is transmitted, and "D" represents that the subframe is a DL subframe where DL data is transmitted. "S" represents that the subframe is a special subframe where control information and maybe data (according to the special subframe configuration) is transmitted.

Device-to-device (D2D) communication may be realized, after an initialization (e.g., connection establishment and/or peer discovery) is performed (e.g., assisted by an eNB). Then, two UEs may communicate (e.g., transmitting and/or receiving packets) with each other (e.g., directly) according to the D2D communication, and the eNB may not need to forward the packets transmitted between the UEs. According to the D2D communication, the UEs may communicate with each other via UL resources (e.g., UL subframes configured by the eNB). In general, the D2D communication may also be seen as a D2D service (i.e., proximity-based service (ProSe)). The D2D service can be a ProSe direct discovery or a ProSe direct communication. In addition, a D2D subframe, D2D transmission, D2D communication and D2D discovery can be termed as a sidelink subframe, sidelink transmission, sidelink communication and sidelink discovery, respectively.

According to the currently developed 3GPP standard, frequency-division multiplexing (FDM) between a D2D communication and a device-to-cellular (D2C) communication is not allowed for a FDD system. The D2C communication and the D2D communication may occur in a same subframe of a same carrier. That is, a UE may be scheduled to perform a D2C transmission and a D2D transmission in the same subframe of the same carrier. The collision between the D2C transmission and the D2D transmission may be resolved according to a proper arrangement of resources. However, the D2C transmission and the D2D transmission may not be performed efficiently due to inefficient usage of the resources and characteristics of the FDD system, even though the collision is resolved. Accordingly, throughputs of the UE and the eNBs are limited.

Thus, how to solve resource allocation for the D2C communication and the D2D communication in the FDD system is an important topic to be discussed.

SUMMARY OF THE INVENTION

The present invention therefore provides a communication device and a method for handling a D2C communication to solve the abovementioned problem.

A network for handling a downlink (DL) transmission in a frequency-division duplexing (FDD) system comprise a storage unit for storing instructions and a processing means coupled to the storage unit. The processing means is configured to execute the instructions stored in the storage unit. The instructions comprise selecting a reference configuration for a DL transmission of a communication device from a plurality of configuration candidates; transmitting information of the reference configuration to the communication device; receiving a hybrid automatic repeat request (HARQ) feedback corresponding to the DL transmission from the communication device according to the reference configuration; and performing the DL transmission with the communication device according to the reference configuration.

A communication device for handling a downlink (DL) transmission in a frequency-division duplexing (FDD) system comprise a storage unit for storing instructions and a processing means coupled to the storage unit. The processing means is configured to execute the instructions stored in the storage unit. The instructions comprise receiving information of a reference configuration for a DL transmission from a network; performing the DL transmission with the network according to the reference configuration; and transmitting a hybrid automatic repeat request (HARQ) feedback corresponding to the DL transmission to the network according to the reference configuration.

A network for handling a downlink (DL) transmission in a frequency-division duplexing (FDD) system comprise a storage unit for storing instructions and a processing means coupled to the storage unit. The processing means is configured to execute the instructions stored in the storage unit. The instructions comprise selecting a reference configuration for a downlink (DL) transmission of a communication device from a plurality of configuration candidates; transmitting information of the reference configuration to the communication device; and receiving a hybrid automatic repeat request (HARQ) feedback corresponding to a DL transmission from the communication device according to a HARQ timing of the reference configuration, when a device-to-device (D2D) communication occurs in a first subframe which is four subframes after a second subframe where the DL transmission is performed.

A communication device for handling a downlink (DL) transmission in a frequency-division duplexing (FDD) system comprise a storage unit for storing instructions and a processing means coupled to the storage unit. The processing means is configured to execute the instructions stored in the storage unit. The instructions comprise receiving information of a reference configuration for a downlink (DL) transmission from a network; and transmitting a hybrid automatic repeat request (HARQ) feedback corresponding to a DL transmission to the network according to a HARQ timing of the reference configuration, when a device-to-device (D2D) communication occurs in a first subframe which is four subframes after a second subframe where the DL transmission is performed.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table of the UL/DL configurations with subframes and corresponding directions.

FIG. 8 is a table of FDD DL configurations according to an example of the present invention.

DETAILED DESCRIPTION

Figure 2:
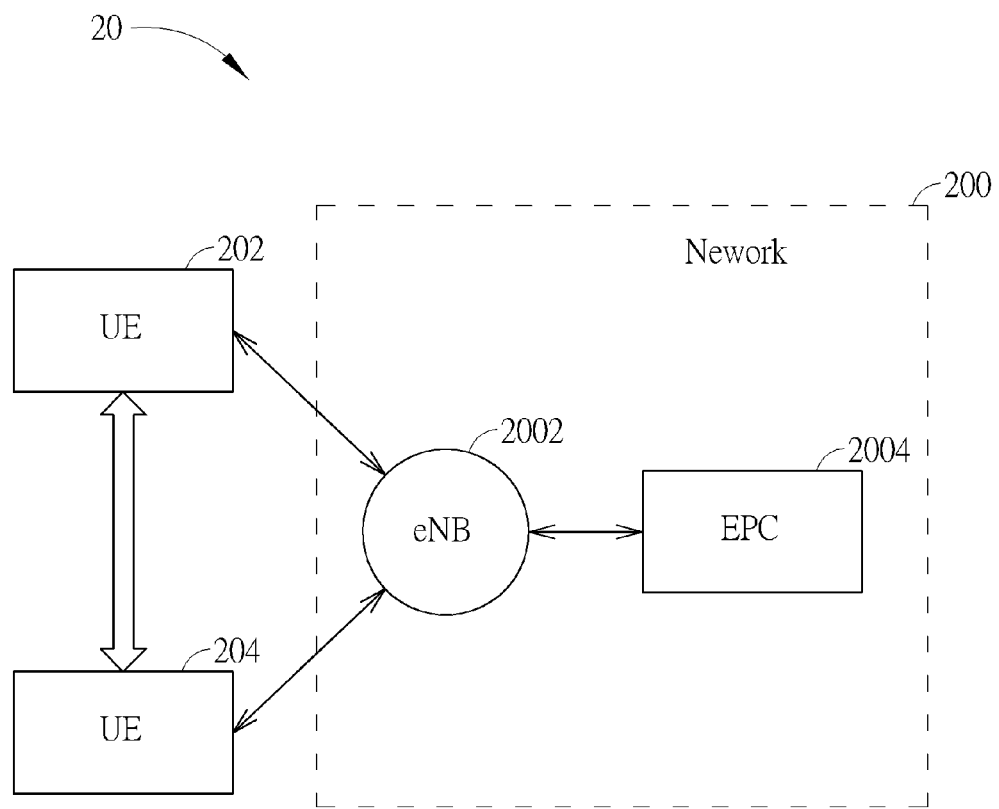
FIG. 2 is a schematic diagram of a wireless communication system according to an example of the present invention.

FIG. 2 is a schematic diagram of a wireless communication system 20 according to an example of the present invention. The wireless communication system 20 is briefly composed of a network 200 and user equipments (UEs) 202 and 204. The wireless communication system 20 may support a time-division duplexing (TDD) mode (e.g., TDD system) and/or a frequency-division duplexing (FDD) mode (e.g., FDD system). In FIG. 2, the network 200 and the UEs 202 and 204 are simply utilized for illustrating the structure of the wireless communication system 20. A UE may communicate with the network 200 according to a device-to-cellular (D2C) communication (i.e., device-to-network (D2N) communication) defined in a communication standard, e.g., the 3rd Generation Partnership Project (3GPP) standard. Practically, the network 200 can be a universal terrestrial radio access network (UTRAN) comprising at least one Node-B (NB) in a universal mobile telecommunications system (UMTS). In another example, the network 200 can be an evolved UTRAN (E-UTRAN) comprising at least one evolved NB (eNB) and/or at least one relay station in a long term evolution (LTE) system, a LTE-Advanced (LTE-A) system or an evolution of the LTE-A system. As an example, the network 200 includes an eNB 2002 connected to an evolved packet core (EPC) 2004 in FIG. 2.

Furthermore, the network 200 can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network 200 receives information transmitted by a UE (e.g., the UE 202 and/or the UE 204), the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A UE (e.g., the UE 202 and/or the UE 204) can be a low cost device (e.g., machine type communication (MTC) device), a device-to-device (D2D) device, a mobile phone, a laptop, a tablet computer, an electronic book, a portable computer system, or combination thereof. In addition, for the D2C communication, the network 200 and the UE can be seen as a transmitter or a receiver according to direction (i.e., transmission direction), e.g., for an uplink (UL), the UE is the transmitter and the network 200 is the receiver, and for a downlink (DL), the network 200 is the transmitter and the UE is the receiver.

In addition, the UEs 202 and 204 may communicate with each other directly, after an initialization (e.g., connection establishment and/or peer discovery) is performed. For example, the initialization may be assisted by the network 200. That is, the UEs 202 and 204 may communicate (e.g., transmit and/or receive signals/packets) with each other according to a D2D communication defined in a communication standard, e.g., 3GPP standard. The UEs 202 and 204 may communicate with each other via UL resources (e.g., UL subframes or UL carriers) determined according to FDD configuration and/or TDD configurations.

Figure 3:
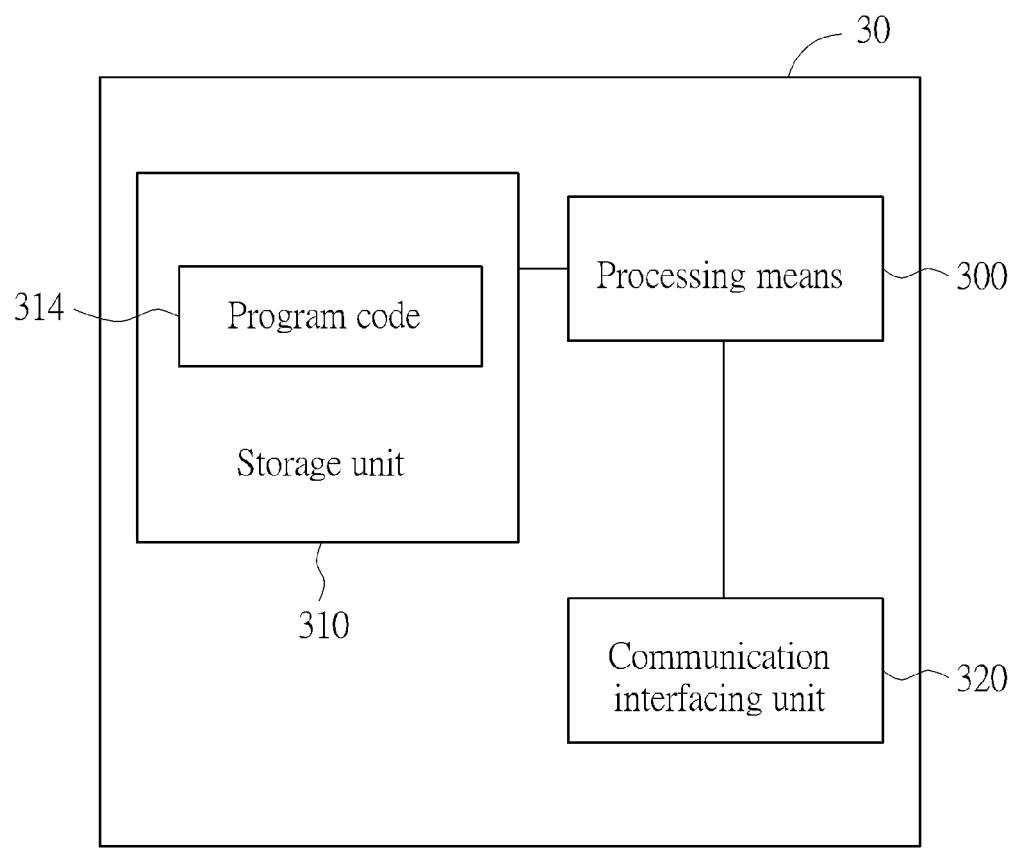
FIG. 3 is a schematic diagram of a communication device according to an example of the present invention.

FIG. 3 is a schematic diagram of a communication device 30 according to an example of the present invention. The communication device 30 may be used for realizing the network 200 (e.g., the eNB 2002 and/or the EPC 2004), the UE 202 and/or the UE 204 shown in FIG. 2, but is not limited herein. The communication device 30 may include a processing means 300 such as a microprocessor or Application Specific Integrated Circuit (ASIC), a storage unit 210 and a communication interfacing unit 320. The storage unit 310 may be any data storage device that may store a program code 314, accessed and executed by the processing means 300. Examples of the storage unit 310 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 320 is preferably a transceiver and is used to transmit and receive signals (e.g., data, signals, messages and/or packets) according to processing results of the processing means 300.

Figure 4:
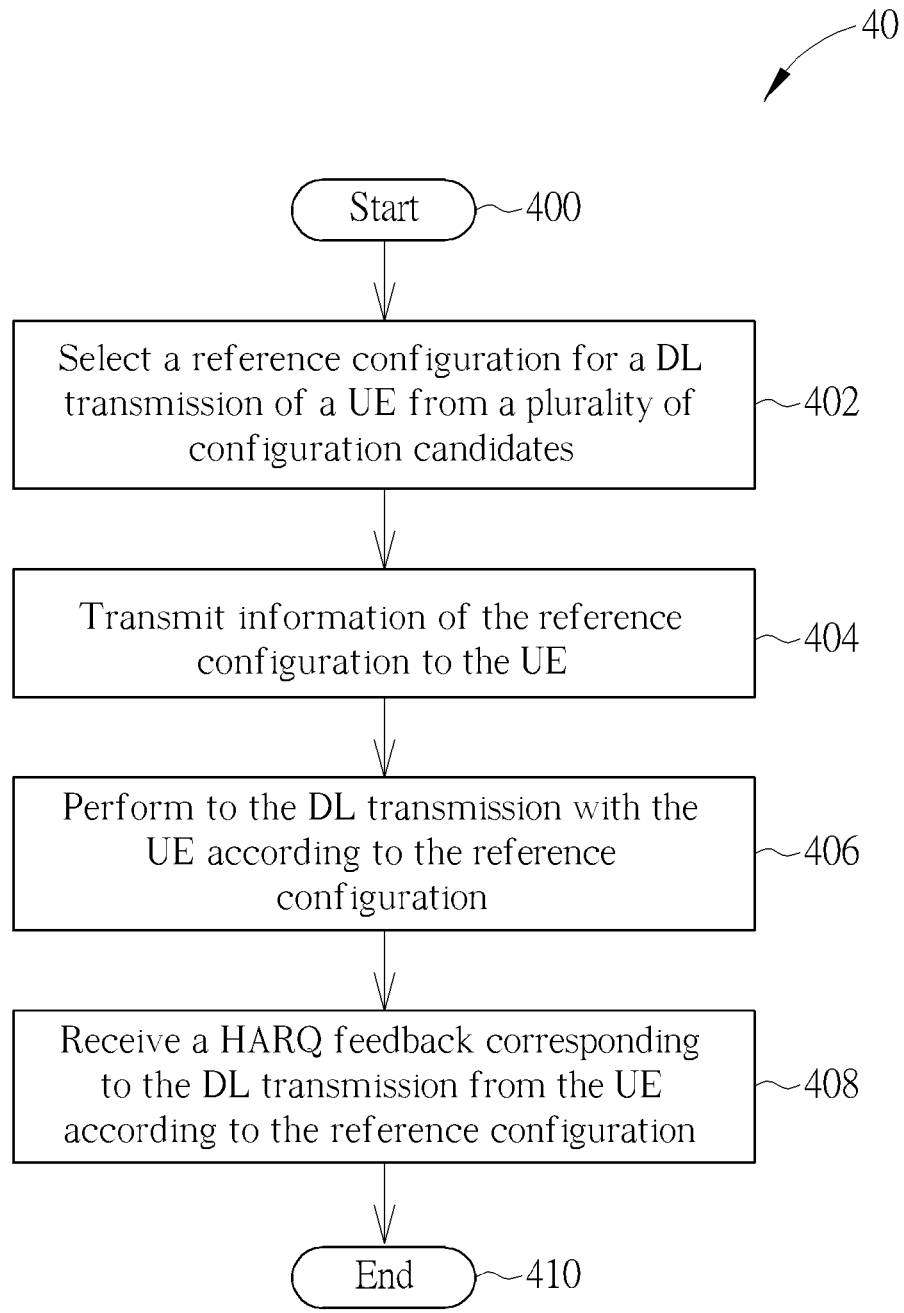
FIG. 4 is a flowchart of a process according to an example of the present invention.

FIG. 4 is a flowchart of a process 40 according to an example of the present invention. The process 40 may be utilized in a network (e.g., the network 200, the eNB 2002 and/or the EPC 2004) shown in FIG. 2, to handle a D2C communication in a FDD system. The process 40 may be compiled into the program code 314 and includes the following steps:

Step 400: Start.

Step 402: Select a reference configuration for a DL transmission of a UE from a plurality of configuration candidates.

Step 404: Transmit information of the reference configuration to the UE.

Step 406: Perform to the DL transmission with the UE according to the reference configuration.

Step 408: Receive a hybrid automatic repeat request (HARQ) feedback corresponding to the DL transmission from the UE according to the reference configuration.

Step 410: End.

According to the process 40, the network may select a reference configuration for a DL transmission of a UE (e.g., the UE 202) from a plurality of configuration candidates, and may transmit information of the reference configuration to the UE. Thus, the network may perform the DL transmission with the UE according to the reference configuration, e.g., a timeline of the reference configuration. The network may also receive a HARQ feedback (e.g., acknowledgement (ACK) or negative acknowledgement (NACK)) corresponding to the DL transmission from the UE according to the reference configuration, e.g., a HARQ timeline of the reference configuration. Note that the HARQ feedback may further correspond to another DL transmission from the communication device. That is, the HARQ feedback received in a subframe may be used for responding to multiple DL transmissions performed in multiple subframes. In other words, the DL transmission and the HARQ feedback not processed (e.g., received by the network or transmitted by the UE) according to the original rule of the FDD system, but are processed according the reference configuration.

The DL transmission mentioned above may be a cellular transmission (i.e., D2C transmission). According to the process 40, HARQ feedback(s) corresponding to DL transmission(s) is going to be transmitted in fewer subframe(s) and more D2D transmissions can be scheduled, because the DL transmission(s) and the corresponding HARQ feedback(s) are processed (e.g., determined) according to the reference configuration. In one example, the network may receive the HARQ feedback in a first subframe which is more than four subframes after a second subframe where the corresponding DL transmission is performed. Further, a D2D communication may occur in a third subframe which is between the first subframe and the second subframe. Thus, throughputs of the D2C communication and the D2D communication are improved, and a collision between the D2C communication and the D2D communication can also be avoided.

Figure 5:
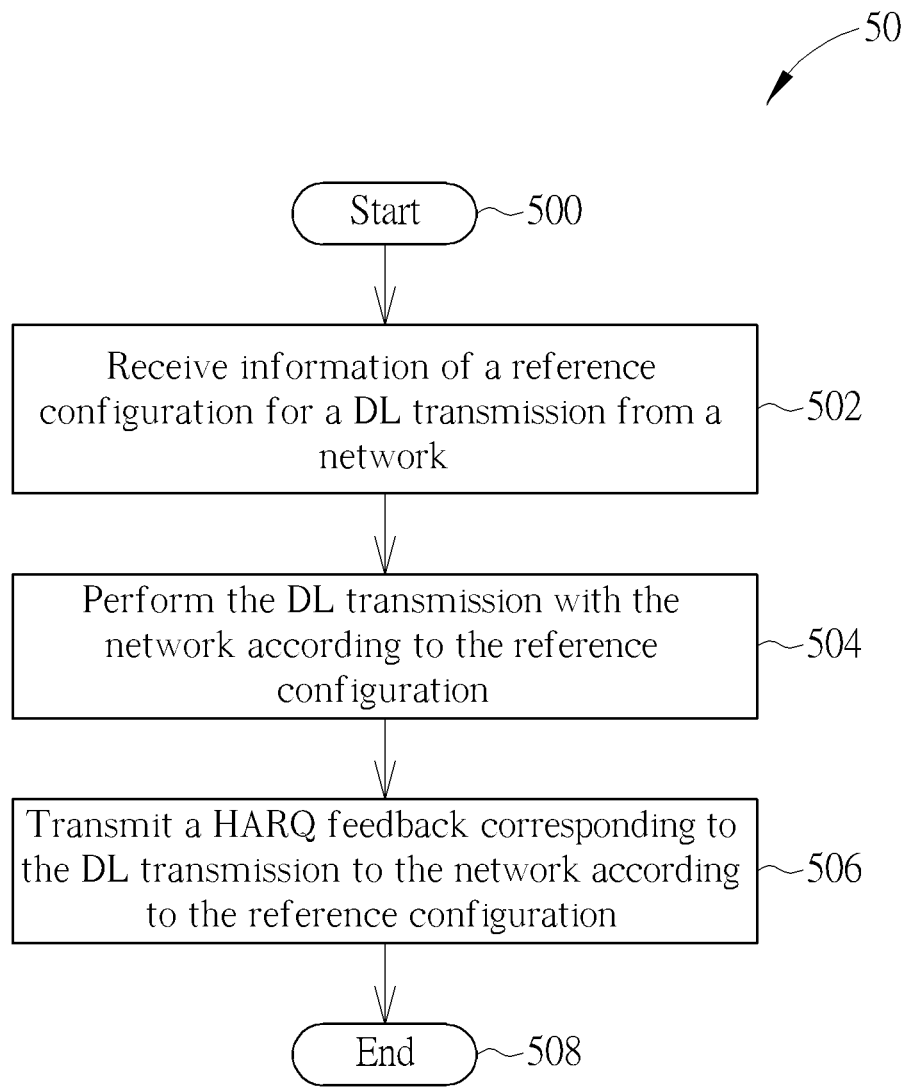
FIG. 5 is a flowchart of a process according to an example of the present invention.

Operations of a UE (e.g., the UE 202 and/or the UE 204) in the above examples can be summarized into a process 50 shown in FIG. 5 to handle a D2C communication in a FDD system, and can be compiled into the program code 314. The process 50 includes the following steps:

Step 500: Start.

Step 502: Receive information of a reference configuration for a DL transmission from a network.

Step 504: Perform the DL transmission with the network according to the reference configuration.

Step 506: Transmit a HARQ feedback corresponding to the DL transmission to the network according to the reference configuration.

Step 508: End.

According to the process 50, the UE may receive information of a reference configuration for a DL transmission from a network (e.g., the network 200, the eNB 2002 and/or the EPC 2004), and may perform the DL transmission with the network according to the reference configuration. Then, the UE may transmit a HARQ feedback corresponding to the DL transmission to the network according to the reference configuration. That is, the UE may perform corresponding operation(s) with the network which realizes the process 40 and related examples. In one example, the UE may transmit the HARQ feedback in a first subframe which is more than four subframes after a second subframe where the corresponding DL transmission is performed. Further, a D2D communication may occur in a third subframe which is between the first subframe and the second subframe. Note that the HARQ feedback may further correspond to another DL transmission with the network. That is, the HARQ feedback transmitted in a subframe may be used for responding to multiple DL transmissions performed in multiple subframes. Detailed operations and variations of the process 50 can be referred to the above illustration and the examples illustrated below, and are not narrated herein.

Figure 6:
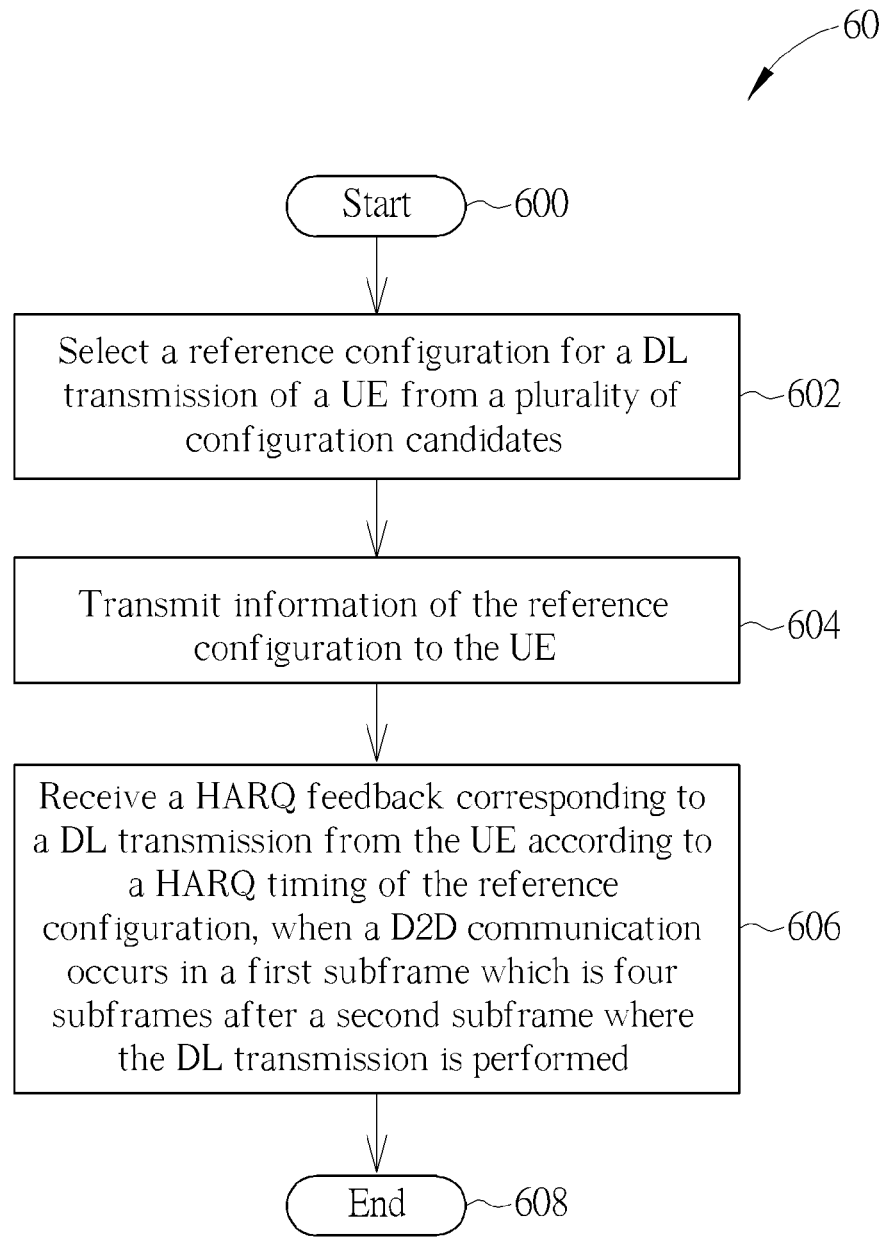
FIG. 6 is a flowchart of a process according to an example of the present invention.

FIG. 6 is a flowchart of a process 60 according to an example of the present invention. The process 60 may be utilized in a network (e.g., the network 200, the eNB 2002 and/or the EPC 2004) shown in FIG. 2, to handle a D2C communication in a FDD system. The process 60 may be compiled into the program code 314 and includes the following steps:

Step 600: Start.

Step 602: Select a reference configuration for a DL transmission of a UE from a plurality of configuration candidates.

Step 604: Transmit information of the reference configuration to the UE.

Step 606: Receive a HARQ feedback corresponding to a DL transmission from the UE according to a HARQ timing of the reference configuration, when a D2D communication occurs in a first subframe which is four subframes after a second subframe where the DL transmission is performed.

Step 608: End.

According to the process 60, the network may select a reference configuration for a DL transmission of a UE (e.g., the UE 202) from a plurality of configuration candidates, and may transmit information of the reference configuration to the UE. When a D2D communication occurs in a first subframe which is four subframes after a second subframe where a DL transmission is performed, the network may receive a HARQ feedback (e.g., acknowledgement (ACK) or negative acknowledgement (NACK)) corresponding to the DL transmission from the UE according to the reference configuration, e.g., a HARQ timeline of the reference configuration. That is, the network may receive the HARQ feedback according to the reference configuration, when the D2D communication collides with the HARQ feedback. Note that the HARQ feedback may further correspond to another DL transmission from the communication device. That is, the HARQ feedback received in a subframe may be used for responding to multiple DL transmissions performed in multiple subframes. In this situation, the original rule (i.e., (n+4) rule) for transmitting the HARQ feedback in the FDD system is replaced with the HARQ timeline of the reference configuration, such that the HARQ feedback can be transmitted/received efficiently.

The DL transmission mentioned above may be a cellular transmission (i.e., D2C transmission). According to the process 60, HARQ feedback(s) is going to be transmitted in fewer subframe(s) and more D2D transmissions can be scheduled, because the DL transmission(s) and the corresponding HARQ feedback(s) are processed (e.g., determined) according to the reference configuration. In one example, the network may receive the HARQ feedback in a third subframe which is more than four subframes after the second subframe where the DL transmission is performed, when the D2D communication occurs in the first subframe. Thus, throughputs of the D2C communication and the D2D communication are improved, and a collision between the D2C communication and the D2D communication can also be avoided.

Realization of the present invention is not limited to the above description.

In one example, the network may receive the HARQ feedback from the UE in a first subframe four subframes after a second subframe where the DL transmission is performed, when a D2D communication does not occur in the first subframe. That is, the network may receive the HARQ feedback from the UE according to whether a collision occurs between the D2C communication and the D2D communication.

Figure 7:
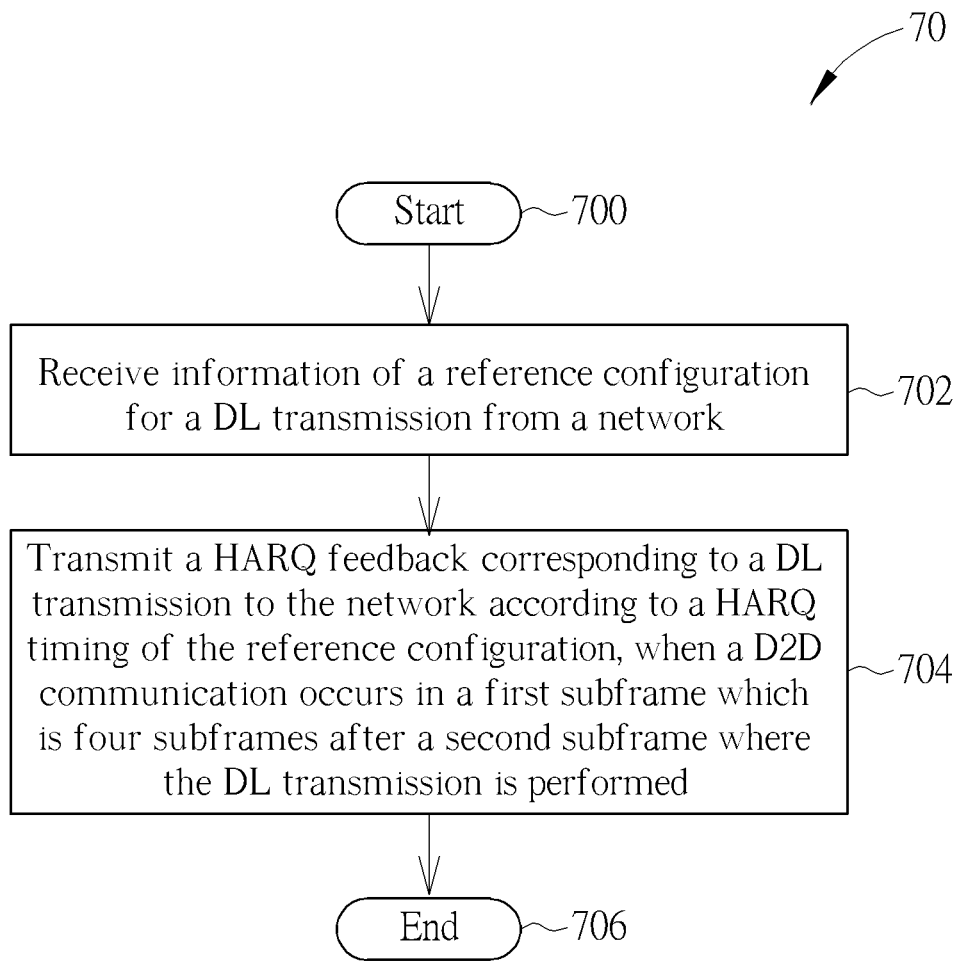
FIG. 7 is a flowchart of a process according to an example of the present invention.

Operations of a UE (e.g., the UE 202 and/or the UE 204) in the above examples can be summarized into a process 70 shown in FIG. 7 to handle a D2C communication in a FDD system, and can be compiled into the program code 314. The process 70 includes the following steps:

Step 700: Start.

Step 702: Receive information of a reference configuration for a DL transmission from a network.

Step 704: Transmit a HARQ feedback corresponding to a DL transmission to the network according to a HARQ timing of the reference configuration, when a D2D communication occurs in a first subframe which is four subframes after a second subframe where the DL transmission is performed.

Step 706: End.

According to the process 70, the UE may receive information of a reference configuration for a DL transmission from a network (e.g., the network 200, the eNB 2002 and/or the EPC 2004). Further, the UE may transmit a HARQ feedback corresponding to a DL transmission to the network according to a HARQ timing of the reference configuration, when a D2D communication occurs in a first subframe which is four subframes after a second subframe where the DL transmission is performed. In one example, the UE may transmit the HARQ feedback in a third subframe which is more than four subframes after the second subframe where the DL transmission is performed, when the D2D communication occurs in the first subframe. Note that the HARQ feedback may further correspond to another DL transmission with the network. That is, the HARQ feedback transmitted in a subframe may be used for responding to multiple DL transmissions performed in multiple subframes. That is, the UE may perform corresponding operation(s) with the network which realizes the process 60 and related examples. Detailed operations and variations of the process 70 can be referred to the above illustration and the examples illustrated below, and are not narrated herein.

The reference configuration in the processes 40, 50, 60 and/or 70 (and related examples) may be determined in various ways and according to various combinations of conditions. In one example, the reference configuration may be selected according to a DL traffic condition of the UE, an interference level (e.g., measured or received by the network), a cell loading of the network and/or a D2D resource requested by the UE. In one example, the reference configuration may be selected semi-statically or statically. That is, a frequency for updating the reference configuration is not limited. In one example, the selection of the reference configuration may be predetermined in the 3GPP standard. That is, the network may select a predetermined configuration from the configuration candidates according to the 3GPP standard, when selecting the reference configuration.

The information of the reference configuration in the process 40, 50, 60 and/or 70 (and related examples) may be transmitted via a higher layer signaling (e.g., radio resource control (RRC) signaling) or a physical layer signaling (e.g., physical DL control channel (PDCCH) signaling). In one example, when the physical layer signaling is used for transmitting the information, a corresponding Cell Radio Network Temporary Identifier (RNTI) may be scrambled with the physical layer signaling (i.e., the signaling is scrambled with the RNTI), wherein the RNTI may be a D2D-reference-RNTI. The physical layer signaling may be allocated in a corresponding UE-specific search space, and the UE-specific search space may be different for each UE. Thus, the UE may receive the reference configuration from the network based on the abovementioned signaling mechanisms.

The FDD system in the process 40, 50, 60 and/or 70 may be a half-duplex (HD) FDD system, or may be a full-duplex (FD) FDD system. The plurality of configuration candidates mentioned above may be provided by Enhanced Interference Mitigation and Traffic Adaptation (eIMTA) defined in the 3GPP standard. That is, the configuration candidates designed for other subjects, such as the eIMTA, may be reused in the present invention. In one example, the plurality of configuration candidates may include at least one UL/DL configuration for HARQ ACK/NACK reporting in a TDD system. In one example, the plurality of configuration candidates may include at least one timing reference for HARQ ACK/NACK reporting in a FDD-TDD carrier aggregation system.

FIG. 8 is a table 80 of FDD DL configurations according to an example of the present invention. The table 80 defines HARQ timings for FDD DL configurations (i.e., UL/DL configurations) 0-14. As an example, the network may determine that the reference configuration is the FDD DL configuration 1 (e.g., select the FDD DL configuration 1 from the FDD DL configurations 0-14). The network may transmit information of the FDD DL configuration 1 to the UE. According to the FDD DL configuration 1, the subframes 2, 4, 7 and 9 may be used for transmitting HARQ feedbacks corresponding to DL transmissions in the subframes 6, 0, 1 and 5, respectively. Correspondingly, the subframes 0, 1, 3, 5, 6 and/or 8 may be allocated for performing D2D transmissions, and a collision between the D2C communication and the D2D communication is avoided. In another example, the network may determine that the reference configuration is the FDD DL configuration 2 (e.g., select the FDD DL configuration 2 from the FDD DL configurations 0-14). The network may transmit information of the FDD DL configuration 2 to the UE. According to the FDD DL configuration 2, the subframes 2, 3, 7 and 8 may be used for transmitting HARQ feedbacks corresponding to DL transmissions in the subframes (5, 6), 9, (0, 1) and 4, respectively. Correspondingly, the subframes 0, 1, 4, 5, 6 and/or 9 may be allocated for performing D2D transmissions, and a collision between the D2C communication and the D2D communication is avoided. In the present example, each of the HARQ feedbacks in the subframes 2 and 7 may be used for responding to DL transmissions in multiple subframes, to improve feedback efficiency. Operations of other FDD DL configurations can be obtained accordingly, and are not narrated herein. The present invention example may be applied to the process 40, 50, 60 and/or 70 (and related examples), and may be combined with the above-mentioned examples.

There may be a short period where the network and the UE have different understandings of HARQ timings due to occurrence of signaling latency and/or activation latency. The network may change (or select) a reference configuration based on that HARQ timings in a previous reference configuration and the present reference configuration are consistent. For example, when the reference configuration is changed from the FDD DL configuration 0 to the FDD DL configuration 2, DL transmissions may only be performed in the subframes 4 and 9. Accordingly, HARQ feedbacks corresponding to the DL transmissions in the subframes 4 and 9 may be transmitted in the subframes 3 and 8 by the UE, respectively, according to both the FDD DL configurations 0 and 2. That is, the HARQ feedbacks can be transmitted (or received) correctly even if the reference configuration is misunderstood, as long as the abovementioned rule for changing the reference configuration is realized.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 30.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set (s) of codes, set (s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 30.

To sum up, the present invention provides a method for handling the D2C communication. According to the present invention, HARQ feedback(s) corresponding to DL (cellular) transmission(s) is going to be transmitted in fewer subframe(s) and D2D transmissions can be scheduled in more subframes. Thus, throughputs of the D2C communication and the D2D communication are improved, and a collision between the D2C communication and the D2D communication can also be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network for handling a downlink (DL) transmission in a frequency-division duplexing (FDD) system, comprising:
   a storage unit for storing instructions of:
   selecting a first reference configuration for a DL transmission of a communication device from a plurality of configuration candidates, wherein the plurality of configuration candidates comprise at least one configuration for a hybrid automatic repeat request (HARQ) acknowledgement/negative acknowledgement (ACK/NACK) reporting in a time-division duplexing (TDD) system and at least one timing reference for the HARQ ACK/NACK reporting in a FDD-TDD carrier aggregation system;
   transmitting information of the first reference configuration to the communication device;
   performing the DL transmission with the communication device according to the first reference configuration; and
   receiving a HARQ feedback corresponding to the DL transmission from the communication device according to the first reference configuration, when a device-to-device (D2D) communication occurs in a first subframe which is four subframes after a second subframe where the DL transmission is performed; and
   a processing means, coupled to the storage unit, configured to execute the instructions stored in the storage unit.

2. The network of claim 1, wherein the first reference configuration is selected according to at least one of a DL traffic condition of the communication device, an interference level, a cell loading of the network, or a resource pattern of the communication device.

3. The network of claim 1, wherein the network is configured to receive the HARQ feedback in the first subframe, when the D2D communication does not occur in the first subframe.

4. The network of claim 1, wherein the network is configured to receive the HARQ feedback in a third subframe which is more than four subframes after the second subframe, when the D2D communication occurs in the first subframe.

5. The network of claim 1, wherein the HARQ feedback further corresponds to another DL transmission from the communication device.

6. The network of claim 1, wherein the FDD system is a half-duplex (HD) FDD system or is a full-duplex (FD) FDD system.

7. The network of claim 1, wherein a HARQ timing of the network receiving the HARQ feedback corresponding to the DL transmission to the communication device is determined based on both the first reference configuration and a second reference configuration, when the network is reconfiguring from the first reference configuration to the second reference configuration.

8. The network of claim 7, wherein the HARQ timing and a timing of the DL transmission to the communication device satisfy both the first reference configuration and the second reference configuration.

9. A communication device for handling a downlink (DL) transmission in a frequency-division duplexing (FDD) system, comprising:
a storage unit for storing instructions of:
receiving information of a first reference configuration for a DL transmission from a network, wherein the first reference configuration is selected from a plurality of configuration candidates, and the plurality of configuration candidates comprises at least one configuration for a hybrid automatic repeat request (HARQ) acknowledgement/negative acknowledgement (ACK/NACK) reporting in a time-division duplexing (TDD) system and at least one timing reference for the HARQ ACK/NACK reporting in a FDD-TDD carrier aggregation system;
performing the DL transmission with the network according to the first reference configuration; and
transmitting a HARQ feedback corresponding to the DL transmission to the network according to the first reference configuration, when a device-to-device (D2D) communication occurs in a first subframe which is four subframes after a second subframe where the DL transmission is performed; and
a processing means, coupled to the storage unit, configured to execute the instructions stored in the storage unit.

10. The communication device of claim 9, wherein the communication device is configured to transmit the HARQ feedback in the first subframe, when the D2D communication does not occur in the first subframe.

11. The communication device of claim 9, wherein the communication device is configured to transmit the HARQ feedback in a third subframe which is more than four subframes after the second subframe, when the D2D communication occurs in the first subframe.

12. The communication device of claim 9, wherein the first reference configuration is selected from a plurality of configuration candidates by the network according to at least one of a DL traffic condition of the communication device, an interference level, a cell loading of the network, or a resource pattern of the communication device.

13. The communication device of claim 9, wherein a HARQ timing of the communication device transmitting the HARQ feedback corresponding to the DL transmission from the network is determined based on both the first reference configuration and a second reference configuration, when the communication device is being reconfigured by the network from the first reference configuration to the second reference configuration.

14. The communication device of claim 13, wherein the HARQ timing and a timing of the DL transmission from the network satisfy both the first reference configuration and the second reference configuration.

15. The communication device of claim 9, wherein the HARQ feedback further corresponds to another DL transmission with the network.

16. The communication device of claim 9, wherein the FDD system is a half-duplex (HD) FDD system or is a full-duplex (FD) FDD system.

* * * * *